Oct. 9, 1962  D. W. HARLING  3,058,012
STAIRCASE GENERATOR WITH CONSTANT CURRENT STORING
CAPACITOR AND INTERMITTENT CHARGE
TRANSFER TO ANOTHER CAPACITOR
Filed March 7, 1961  2 Sheets-Sheet 1
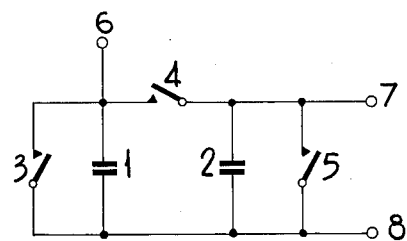
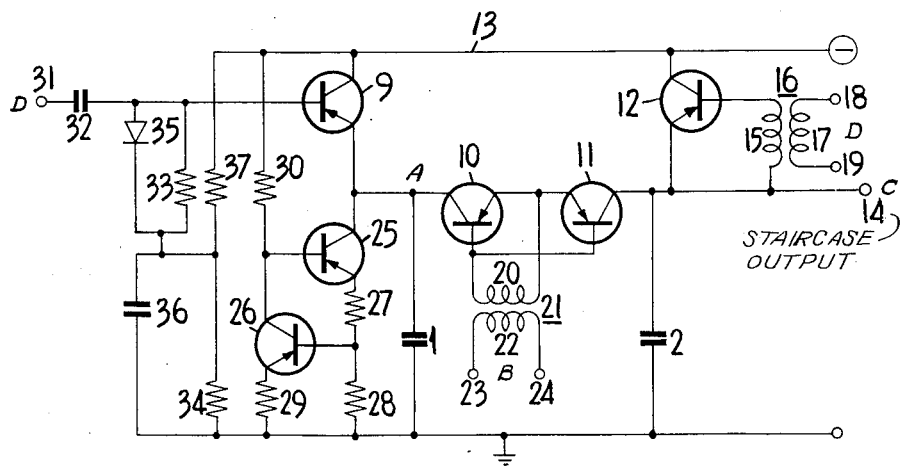
INVENTOR
DENIS WILLIAM HARLING
BY
ATTORNEYS

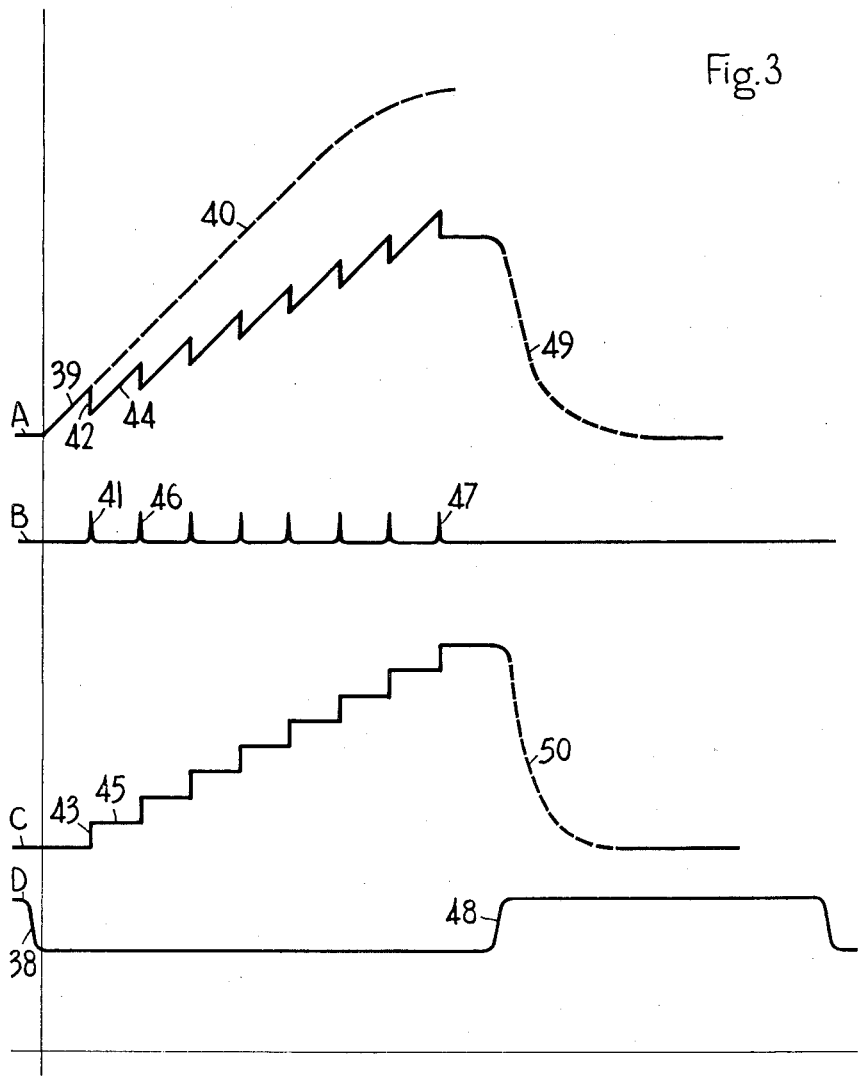

United States Patent Office 3,058,012
Patented Oct. 9, 1962

3,058,012
STAIRCASE GENERATOR WITH CONSTANT CURRENT STORING CAPACITOR AND INTERMITTENT CHARGE TRANSFER TO ANOTHER CAPACITOR
Denis William Harling, Mackinac Island, Mich., assignor to General Electric Company Limited, London, England
Filed Mar. 7, 1961, Ser. No. 93,892
Claims priority, application Great Britain Mar. 8, 1960
4 Claims. (Cl. 307—88.5)

This invention relates to electric waveform generators. More particularly, the invention is concerned with waveform generators which provide an output signal the waveform of which, when plotted against a linear time scale, is formed by a succession of steps. Hereafter in this specification such a waveform generator will be referred to as a "staircase generator" by which term it is frequently known.

According to the present invention, a staircase generator comprises first and second capacitances, control means arranged to cause the charges on the capacitances to have predetermined values at the beginning of each cycle of operations, means to supply a current of substantially constant value to the first capacitance, switch means to connect the capacitances together momentarily a number of times during each cycle of operations so that the charges on the capacitances are shared and a step therefore appears in the output signal each time the capacitances are connected together, and means arranged, when the required number of steps in the output signal have been produced, to operate said control means so that the charges on the capacitances again assume said predetermined values, the voltage across the second capacitance or a signal derived from that voltage constituting the required output signal of the generator.

Preferably said switch means comprises the emitter-collector paths of first and second junction transistors, which are similar to one another and each of which have emitter, collector and base electrodes, said transistors being connected with their emitter-collector paths in series opposition and normally presenting a high impedance between the first and second capacitances, and means to control said transistors to have a low impedance when it is required to share the charges on said capacitances.

One terminal of each of said capacitances may be connected to earth, whilst said control means may comprise third and fourth junction transistors, each having emitter, collector and base electrodes, the other terminal of each of the first and second capacitances being connected to a source of stabilised potential by way of the emitter-collector path of the third or fourth transistor respectively, and means to control the impedances of said third and fourth transistors whereby they normally present a high impedance between the first and second capacitances respectively and the source but, when it is required to bring the charges on the capacitances to said predetermined values, the third and fourth transistors assume a low impedance.

A staircase generator in accordance with the present invention will now be described by way of example with reference to the accompanying drawings in which:
FIGURE 1 shows the basic features of the circuit of the generator,
FIGURE 2 shows the circuit of the generator, and
FIGURE 3 shows the waveforms appearing at various points of the circuit of FIGURE 2.

The generator to be described is required to produce a staircase waveform which may be used, for example, in a pulse code modulation system.

The basic arrangement may be understood from FIGURE 1 of the drawings, to which reference is now made.

This arrangement comprises capacitors 1 and 2 which are of equal value and three switches 3, 4 and 5. There is also means (not shown) to supply a current of constant value to the capacitor 1 by way of a terminal 6. The required output signal is derived from the terminals 7 and 8.

Prior to the beginning of a cycle of operations the switches 3 and 5 are closed, so that the capacitors 1 and 2 are discharged, and the switch 4 is open. At the beginning of a cycle the switches 3 and 5 are opened and the constant current previously referred to begins to charge the capacitor 1. At a predetermined instant after the beginning of the cycle the switch 4 is momentarily closed so that the charge on the capacitor 1 is shared with the capacitor 2. Since the capacitors 1 and 2 are of equal value the voltage across the capacitor 1 immediately after the switch 4 has been closed for the first time will be half the value which it had immediately prior to the closure of the switch 4.

Since the switch 4 is only closed momentarily the voltage across the capacitor 1 will continue to rise in the same way when the switch 4 is opened and will continue to do so until the next predetermined instant when the switch 4 is again momentarily closed. It will be appreciated that each closure of the switch 4 will cause a step in the voltage waveform output signal, which is derived from the terminals 7 and 8, and that by suitably controlling the value of the current supplied to the capacitor 1 by way of the terminal 6 the amplitude of the steps in the output signal, is of course, equal to the interval between successive steps, that is to say, the interval between two successive changes in the value of the voltage of the output signal, is of course, equal to the interval between successive closures of the switch 4.

Referring now to FIGURE 2 of the drawings, this shows in more detail a circuit for generating a staircase waveform in the manner described with reference to FIGURE 1. The capacitors 1 and 2 of FIGURE 1 appear in FIGURE 2 also and are therefore designated by the same reference numerals. The switch 3 (FIGURE 1) is formed by a junction transistor 9 having emitter, collector and base electrodes and the switch 4 (FIGURE 1) is formed by two junction transistors 10 and 11, each having emitter, collector and base electrodes. The switch 5 (FIGURE 1) is formed by a junction transistor 12 having emitter, collector and base electrodes.

One electrode of the capacitor 1 is connected to earth whilst the other electrode is connected to the emitter electrode of the transistor 9, the collector electrode of the transistor 9 being connected to a supply line 13 which is maintained at a stabilized negative potential relative to earth. One electrode of the capacitor 2 is also connected to earth, the other electrode being connected to the emitter electrode of the transistor 12, the collector electrode of which is connected to the supply line 13. The base electrode of the transistor 12 is connected to an output terminal 14 by way of a winding 15 of a transformer 16, the terminal 14 also being connected to the emitter electrode of the transistor 12. The other winding 17 of the transformer 16 is connected to input terminals 18 and 19.

The electrode of the capacitor 1 remote from earth is connected to the collector electrode of the transistor 10, the emitter electrode of the transistor 10 being connected to the emitter electrode of the transistor 11, whilst the collector electrode of the transistor 11 is connected to the electrode of the capacitor 2 remote from earth. The base electrodes of the transistors 10 and 11 are connected together and are connected by way of a winding 20 of a transformer 21 to the emitter electrodes of the transistors 10 and 11. The terminals of the other winding 22 of the transformer 21 are connected to input terminals 23 and 24 respectively.

The means for supplying a constant current to the capacitor 1 comprises two transistors 25 and 26 each of which is similar to the transistor 12. The collector electrode of the transistor 25 is connected to the electrode of the capacitor 1 remote from earth, whilst the emitter electrode of the transistor 25 is connected to earth by way of resistors 27 and 28 in series. The junction of the resistors 27 and 28 is connected to the base electrode of the transistor 26, the emitter electrode of the transistors 26 being connected to earth by way of a resistor 29, whilst the collector electrode of the transistor 26 is connected to the supply line 13 by way of a resistor 30 and is also connected to the base electrode of the transistor 25.

The base electrode of the transistor 9 is connected to an input terminal 31 by way of a capacitor 32, and is also connected to earth by way of resistors 33 and 34 in series. Connected in parallel with the resistor 33 is a rectifier element 35 having its direction of higher conductivity of current towards earth, and connected in parallel with the resistor 34 is a capacitor 36. The junction of the resistors 33 and 34 is connected to the supply line 13 by way of a resistor 37.

The operation of this circuit will now be described with reference also to FIGURE 3 of the drawings, which shows the waveform of the signal appearing at various points of the circuit of FIGURE 2 during a cycle of operations. These waveforms are as follows:

Waveform A represents the voltage appearing across the capacitor 1,

Waveform B represents the series of voltage spikes which are applied at regularly recurrent intervals across the terminals 23 and 24, Waveform C represents the output signal which is derived from the terminal 14, and Waveform D represents the voltage which is applied to the terminal 31, and across the terminals 18 and 19.

Prior to the beginning of a cycle the bias appearing on the base electrodes of the transistors 9 and 12, due to the waveform D which is applied to the terminal 31, and across the terminals 18 and 19, is such as to render the transistors 9 and 12 conducting, so that the capacitors 1 and 2 are charged to substantially the same voltage as the supply line 13. During this period the transistors 10 and 11 are non-conducting.

Immediately prior to the beginning of a cycle the polarity of the waveform D changes, as indicated by the part 38 of the waveform D, thereby altering the bias on the base electrodes of the transistors 9 and 12 so that the transistors 9 and 12 become non-conducting. Here it may be mentioned that the purpose of the part of the circuit comprised by resistors 33, 34 and 37, rectifier element 35 and capacitor 36 is merely to ensure that the bias applied to the base electrode of the transistor 9 changes in such a way that the transistor 9 changes rapidly from being conducting to being non-conducting or vice versa when required.

As soon as the transistor 9 becomes non-conducting the voltage on the capacitor 1 begins to be affected by the constant current which is supplied to it by way of the transistor 25 and resistors 27, 28 and 30. The transistor 26 and resistor 29 are provided merely to compensate for variations due, for example, to temperature variations which might affect the value of the current supplied by the transistor 25. With the arrangement shown, a fall in the current supplied by the transistor 25 will cause a change in the value of the potential at the junction of the resistors 27 and 28 so that the transistor 26 becomes less conducting. This in turn changes the bias on the base electrode of the transistor 25 so that the current supplied by the transistor 25 increases. An increase in the current supplied by the transistor 25 will be similarly compensated.

The effect of the current supplied by the transistor 25 to the capacitor 1 is to cause the voltage on the capacitor 1 to vary as indicated by the part 39 of the waveform A and, in fact, if the charge on the capacitor 1 were not shared with the capacitor 2 at intervals, the voltage on the capacitor 1 would continue to change linearly as indicated by the broken part 40 of the waveform A. It should perhaps be mentioned that the capacitor 1 is being discharged by the current supplied by it to the transistor 25, the voltage on the capacitor 1 at the beginning of a cycle being approximately equal to the voltage of the supply line 13 and the voltage on the capacitor 1 changing towards zero during a cycle.

At a predetermined interval after the start of the cycle the first spike 41 of the waveform B is supplied across the terminals 23 and 24, causing the transistors 10 and 11 to conduct, so that the capacitors 1 and 2 share their charges. Since the capacitors 1 and 2 are of equal value, the effect of this is to change the voltage on each of the capacitors 1 and 2 to a value which is equal to the arithmetic means of their voltages immediately prior to the transistors 10 and 11 becoming conducting. In the case of the capacitor 1, therefore, the voltage across it changes in the manner indicated by the part 42 of the waveform A, whilst in the case of the capacitor 2 the voltage across it changes as indicated by the part 43 of the waveform C. Since the output waveform corresponds to the waveform C of the voltage on the capacitor 2 the part 43 of the waveform C represents the first step in the output signal. The transistors 10 and 11 only conduct momentarily and immediately after the spike 41 of the waveform B the voltage across the capacitor A will continue to change as indicated by the part 44 of the waveform A, whilst the voltage on the capacitor 2 will remain steady as indicated by the part 45 of the waveform C.

This will continue until the next spike 46 of the waveform B is applied across the terminals 23 and 24 causing the transistors 10 and 11 to conduct again.

It is desirable to use two transistors 10 and 11 in the manner indicated, because if a single transistor were used as this switch there would be a tendency for currents to circulate due, for example, to the voltage difference between its base and emitter electrodes, such circulating currents varying the voltages on the capacitors 1 and 2 in an undesired manner.

At the end of a cycle, after the last spike 47 of the waveform B, the polarity of the waveform D changes as indicated by the part 48 of that waveform, so that the transistors 9 and 12 again become conducting and the voltage on the capacitors 1 and 2 resume their original levels, as indicated by the broken parts 49 and 50 of the waveforms A and C respectively. The circuit will then remain quiescent until the beginning of the next cycle.

In a typical embodiment of the circuit of FIGURE 2 the components are as follows:

| Component | Value |
|---|---|
| Capacitors 1 and 2 | picofarads 4700 |
| Resistor 27 | ohms 560 |
| Resistor 28 | do 100 |
| Resistor 29 | do 220 |
| Resistor 30 | kilohms 3 |
| Capacitor 32 | microfarad 0.02 |
| Resistor 33 | kilohms 22 |
| Resistor 34 | do 12 |
| Capacitor 36 | microfarad 0.05 |
| Resistor 37 | kilohms 5.6 |

The transistors 9, 10 and 11 are developmental type EW93 as supplied by The General Electric Co. Ltd.

The transistors 12, 25 and 26 are type GET872 as supplied by The General Electric Co. Ltd.

The rectifier element 35 is type GEX54 as supplied by The General Electric Co. Ltd.

The voltage of supply line 13 is stabilised at minus 12 volts.

The repetition rate of the pulses of the waveform D or FIGURE 3 is 96 kilocycles per second.

The interval between successive spikes of the waveform B of FIGURE 3 is 0.32 microsecond.

It will be appreciated that it is not essential for a complete cycle to be performed on each occasion. Thus if the series of spikes of the waveform B is interrupted, prior to the end of a cycle, the voltage across the capacitor 2 will remain at the level which it has then reached until the end of the cycle. Then, when transistors 9 and 12 become conducting, the voltage across the capacitor 2 will return to its original level.

I claim:

1. A staircase generator comprising first and second capacitances, control means arranged to cause the charges on the capacitances to have predetermined values at the beginning of each cycle of operations, means to supply a current of substantially constant value to the first capacitance, switch means to connect the capacitances together momentarily a number of times during each cycle of operations so that the charges on the capacitances are shared and a step therefore appears in the output signal each time the capacitances are connected together, and means arranged, when the required number of steps in the output signal have been produced, to operate said control means so that the charges on the capacitances again assume said predetermined values, the voltage across the second capacitance or a signal derived from that voltage constituting the required output signal of the generator.

2. A staircase generator according to claim 1 wherein said switch means comprises the emitter-collector paths of first and second junction transistors, which are similar to one another and each of which have emitter, collector and base electrodes, said transistors being connected with their emitter-collector paths in series opposition and normally presenting a high impedance between the first and second capacitances, and means to control said transistors to have a low impedance when it is required to share the charges on said capacitances.

3. A staircase generator according to claim 2 wherein one terminal of each of said capacitances is connected to earth, whilst said control means comprises third and fourth junction transistors, each having emitter, collector and base electrodes, the other terminal of each of the first and second capacitances being connected to a source of stabilised potential by way of the emitter-collector path of the third or fourth transistor respectively, and means to control the impedances of said third and fourth transistors whereby they normally present a high impedance between the first and second capacitances respectively and the source but, when it is required to bring the charges on the capacitances to said predetermined values, the third and fourth transistors assume a low impedance.

4. A staircase generator according to claim 1, wherein said control means is arranged to cause said capacitances to be charged at the beginning of each cycle of operations, and said current of substantially constant value which is supplied to the first capacitance is arranged to decrease the charge on the first capacitance.

No references cited.